(12) United States Patent
Chen

(10) Patent No.: US 10,551,260 B2
(45) Date of Patent: Feb. 4, 2020

(54) PEDAL EXERCISE SIGNAL DETECTION DEVICE

(71) Applicant: Bion Inc., New Taipei (TW)

(72) Inventor: Yi-Lun Chen, Taipei (TW)

(73) Assignee: BION INC., New Taipei (TW)

( * ) Notice: Subject to any disclaimer, the term of this patent is extended or adjusted under 35 U.S.C. 154(b) by 254 days.

(21) Appl. No.: 15/713,720

(22) Filed: Sep. 25, 2017

(65) Prior Publication Data

US 2018/0087983 A1 Mar. 29, 2018

(30) Foreign Application Priority Data

Sep. 26, 2016 (TW) .............................. 105130962 A

(51) Int. Cl.
| | |
|---|---|
| *B62M 3/00* | (2006.01) |
| *G01L 5/22* | (2006.01) |
| *A63B 22/06* | (2006.01) |
| *A63B 69/16* | (2006.01) |
| *G01L 3/24* | (2006.01) |
| *A63B 22/00* | (2006.01) |

(Continued)

(52) U.S. Cl.
CPC .......... *G01L 5/225* (2013.01); *A63B 22/0046* (2013.01); *B62M 3/086* (2013.01); *G01L 3/242* (2013.01); *A63B 22/0605* (2013.01); *A63B 23/0476* (2013.01); *A63B 69/16* (2013.01); *A63B 71/0622* (2013.01); *A63B 2220/56* (2013.01); *A63B 2220/833* (2013.01); *A63B 2225/50* (2013.01); *B62J 2099/002* (2013.01)

(58) Field of Classification Search
CPC ......... B62M 3/08; B62M 3/086; G01L 3/242; G01L 5/225; A63B 22/0046; A63B 22/0605; A63B 2220/56; A63B 2220/833; A63B 2225/50; A63B 23/0476; A63B 69/16; A63B 71/0619; A63B 71/0622; B62J 2099/002
See application file for complete search history.

(56) References Cited

U.S. PATENT DOCUMENTS

| | | | |
|---|---|---|---|
| 8,327,723 B2 * | 12/2012 | Roudergues | G01L 5/225 73/760 |
| 9,969,451 B2 * | 5/2018 | Sasaki | B62J 99/00 |

(Continued)

FOREIGN PATENT DOCUMENTS

| | | | |
|---|---|---|---|
| CN | 102853958 | 1/2013 | |
| DE | 19613079 A1 * | 11/1997 | B62M 1/10 |

(Continued)

*Primary Examiner* — Adam D Rogers
(74) *Attorney, Agent, or Firm* — Leong C. Lei

(57) ABSTRACT

A pedal exercise signal detection device includes a sleeve having an outer circumference having a pressure signal connection device and a pressure detection unit mounted thereon; a first bearing disposed in the sleeve; a stator having a positioning axle having an end formed with a fastening hole; a fastener element fastening the stator and the sleeve together; a pedal having an axle hole into which the sleeve is inserted to be positioned therein and a receiving trough including a through opening corresponding to the pressure signal connection device; and a control circuit board disposed in the receiving trough and including signal reader units that extend through the through opening and corresponding to the pressure signal connection device.

12 Claims, 11 Drawing Sheets

(51) Int. Cl.
*B62M 3/08* (2006.01)
*A63B 71/06* (2006.01)
*A63B 23/04* (2006.01)
*B62J 99/00* (2009.01)

(56) References Cited

U.S. PATENT DOCUMENTS

2007/0137307 A1   6/2007  Gruben
2014/0273543 A1*  9/2014  Hanshew .............. H01R 39/64
                                                        439/18

FOREIGN PATENT DOCUMENTS

| DE | 202016000321 U1 * | 4/2016 | ............. B62M 3/00 |
| EP | 2072387 A1 * | 6/2009 | ............. B62J 99/00 |
| JP | 2008221880 A * | 9/2008 | ............. B62M 3/08 |
| WO | WO/2010/109397 | 9/2010 | |
| WO | WO/2014/184485 | 11/2014 | |
| WO | WO-2016087740 A1 * | 6/2016 | ............. B62M 3/08 |
| WO | WO-2018070677 A1 * | 4/2018 | |

* cited by examiner

PEDAL EXERCISE SIGNAL DETECTION DEVICE

BACKGROUND OF THE INVENTION

1. Field of the Invention

The present invention relates to exercise detection equipment for bicycles, and in particular to a pedal exercise signal detection device that detects and measures force and motion trace of a pedal to provide as exercise reference to a rider.

2. The Related Arts

To overcome diseases of civilization caused by obesity resulting from overeating and over-nutrition, modern people often resort to exercise to regulate physiological functionality in order to meet the requirement of healthy. Bicycle exercise is good for improve cardiopulmonary function and also helps train back muscles and heaps and lower limbs and is very popular for exercise lovers.

Bicycle exercise requires constantly and continuously pedaling in order to achieve the desired result of exercise. Sports injuries may readily occur on the riders for pedaling for a long time, and riding performance may not be improved. Thus, various detection devices have been proposed and are available in the market to record exercise condition of each riding that a rider takes or to detect exercise force signals of left and right feet generated in the course of exercise to provide as exercising reference information for the rider so that the rider may base on such information to adjust exercise habit and improve riding performance.

An example is disclosed in U.S. Pat. No. 8,011,242 B2, which includes four detection elements arranged on each of two sides of a pedal axle stator to detect and analyze the magnitudes of the forces that a rider applies to the bicycle pedal and a force application condition of force distribution on a surface of the bicycle pedal so that the rider may get aware of continuous data related to a full turn of rotation for improving the rider's pedaling efficiency in order to achieve better performance of bicycle exercise. However, in the known device, the exercise signals detected by the detection elements are transmitted in a wired manner, through a connector, to an opposite terminal. The structure is complicated and wiring must be extended through the side where the pedal is coupled to the bicycle so that the wiring is exposed and may be potential to readily cause dangers. This is apparently not a perfect arrangement. Further, the known device includes four detectors (upper, lower, left and right) provided on two sides of the stator. When a rider depresses down the pedal, the pedal rotor may not be on the detectors, and may be at a location between two detectors, and consequently, the detectors may not correctly detect the pedaling force and the force detected is not the actual force applied. The accuracy of detection is poor.

SUMMARY OF THE INVENTION

To overcome such problems of the prior art, an objective of the present invention is to provide a bicycle exercise signal detection device that detects, simultaneously, an exercise signal and a motion trace.

Another objective of the present invention is to provide a bicycle exercise signal detection device that is integrated with a bicycle pedal, provides high accuracy of signal detection, and is free of wiring exposure.

To achieve the above objectives, the present invention provides a pedal exercise signal detection device, which comprises a sleeve, which has an outer circumference that is provided with at least one pressure signal connection device and at least one pressure detection unit; a first bearing, which is disposed in the sleeve; a stator, which has an end comprising a positioning axle, the positioning axle having a free end that is formed with a fastening hole; a fastener element, which fastens the stator and the sleeve together; a pedal, which comprises an axle hole and a receiving trough, the axle hole receiving the sleeve to insert therein so as to position the sleeve in the axle hole, the receiving trough comprising a through opening formed in a location corresponding to the pressure signal connection device of the sleeve; and a control circuit board, which is disposed in the receiving trough of the pedal, the control circuit board comprising a plurality of signal reader units that extend through the through opening of the receiving trough and corresponding to the pressure signal connection device. The pedal exercise signal detection device may acquire an exercise signal that is transmitted through a wireless transmission module to a display to present exercising reference information to the rider.

An operation theory of the present invention will be described as follows. Reference is now made to FIGS. 1-3, FIG. 1 is a schematic view illustrating stress distribution on a pedal of a bicycle when the pedal is being treaded. When a rider treads the pedal at an angular position of 90 degrees as shown in FIG. 3, an upper surface of the pedal receives the largest tensile stress (as shown in the upper portion of FIG. 2). When the pedal is treaded at an angular position of 0 degree as shown in FIG. 3, the stress is null. When the pedal is treaded at an angular position of 270 degrees as shown in FIG. 3, namely the pedal is treaded to the lowest position, the compression stress induced in the largest.

Referring to FIG. 4, when the rider treads the pedal from the upper side, the pedal works like a rocker arm coupled to a center of a flywheel and thus, if the rocker arm has a length L, under the application of a pedaling force F (the force F comprises an X-axis component and a Y-axis component), a torque generated is as follows:

$$\text{Torque} = F \cos \theta = F_{yx} L$$

And, the generated Power=Torque×ω2 (where ω is angular speed)

This invention provides that a sleeve and a stator coupled to each other and the sleeve is coupled to the pedal so as to integrate with the pedal. During exercise, detectors that are arranged on two sides of the sleeve are combined, in an integrated form, with the pedal so that a pedaling force is applied, from an axle of a stator, directly to the detectors of the sleeve, and the axle of the stator has an end that is mounted, through a bearing, to an end of the sleeve and the sleeve is set in threading engagement with a rotor and the detectors are arranged on two sides of the sleeve so that the pedaling force can be accurately detected.

Even more, the detectors that are provided on two sides of the sleeve are integrated with the pedal as a unitary arrangement and the control circuit board is disposed in the pedal, this also being an integrated unitary arrangement, so that stability can be improved.

Based on the above, the pedal exercise signal detection device according to the present invention is operable to simultaneously detect an exercise signal and a motion trace. Further, the present invention provides a control circuit board that is disposed in a receiving trough and comprises a trace detection unit and a pressure detection circuit to read, by means of a signal reader unit, a force application condition of a rider treading a pedal and an exercise signal concerning an angular position of the pedal in space, which are then processed by a signal processor unit so that the processed exercise signal is transmitted through a wireless transmission module to a display. As such, the present invention is totally free of concerns of wiring exposure.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
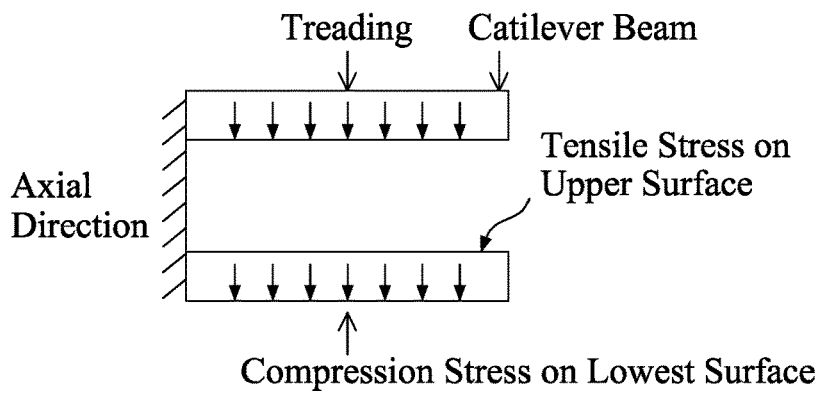
FIGS. 1-3 are schematic views illustrating a condition of force application on a bicycle pedal, force application angles, and variations of tensile stress and compression stress.
Figure 2:
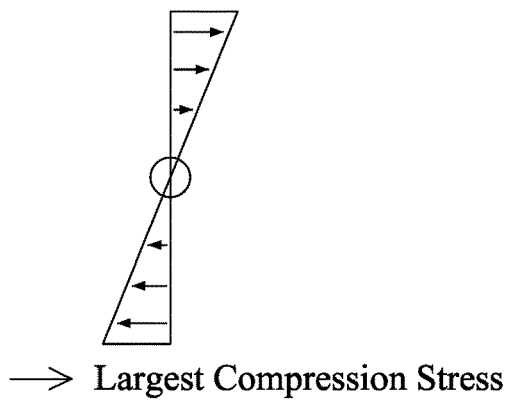
Figure 3:
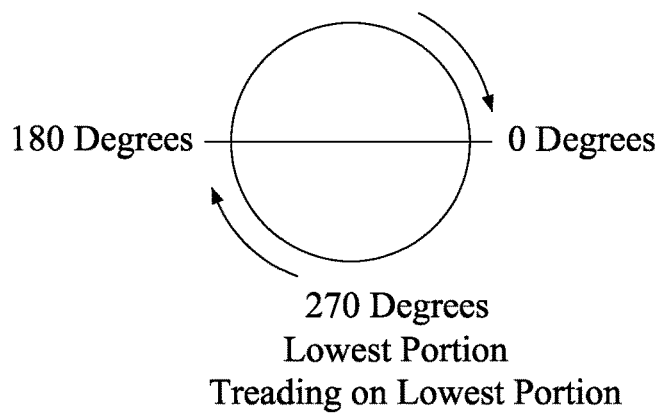
Figure 4:
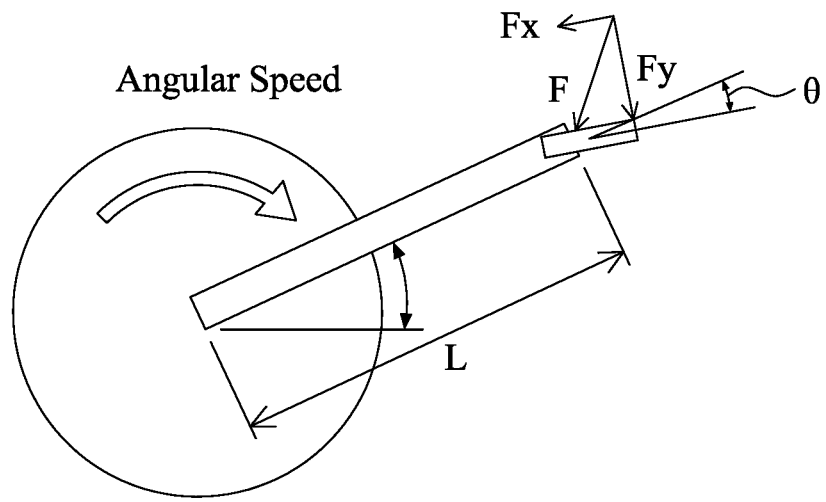
FIG. 4 is a schematic view illustrating a relationship among a pedaling force, a pedal, a rocker arm length for a condition of a bicycle pedal being treaded.
Figure 5:
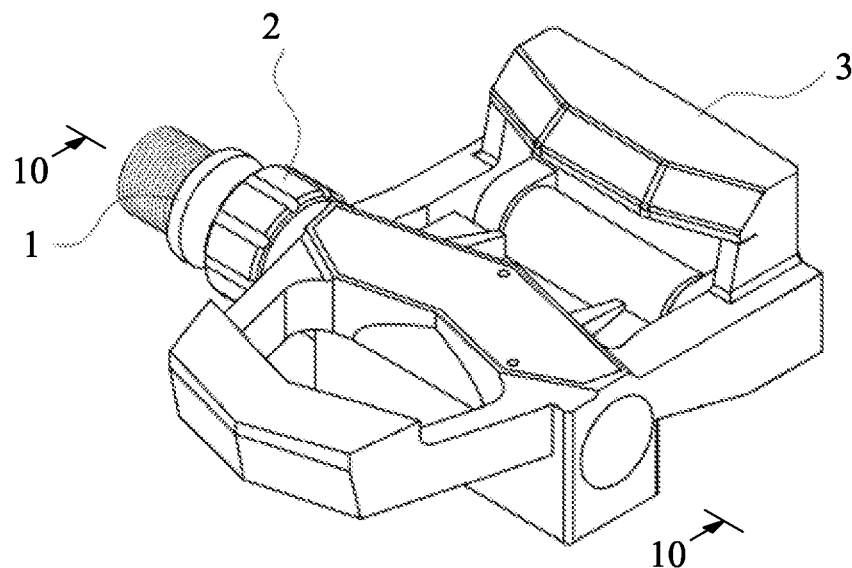
FIG. 5 is a perspective view of a pedal exercise signal detection device according to a first embodiment of the present invention.
Figure 6:
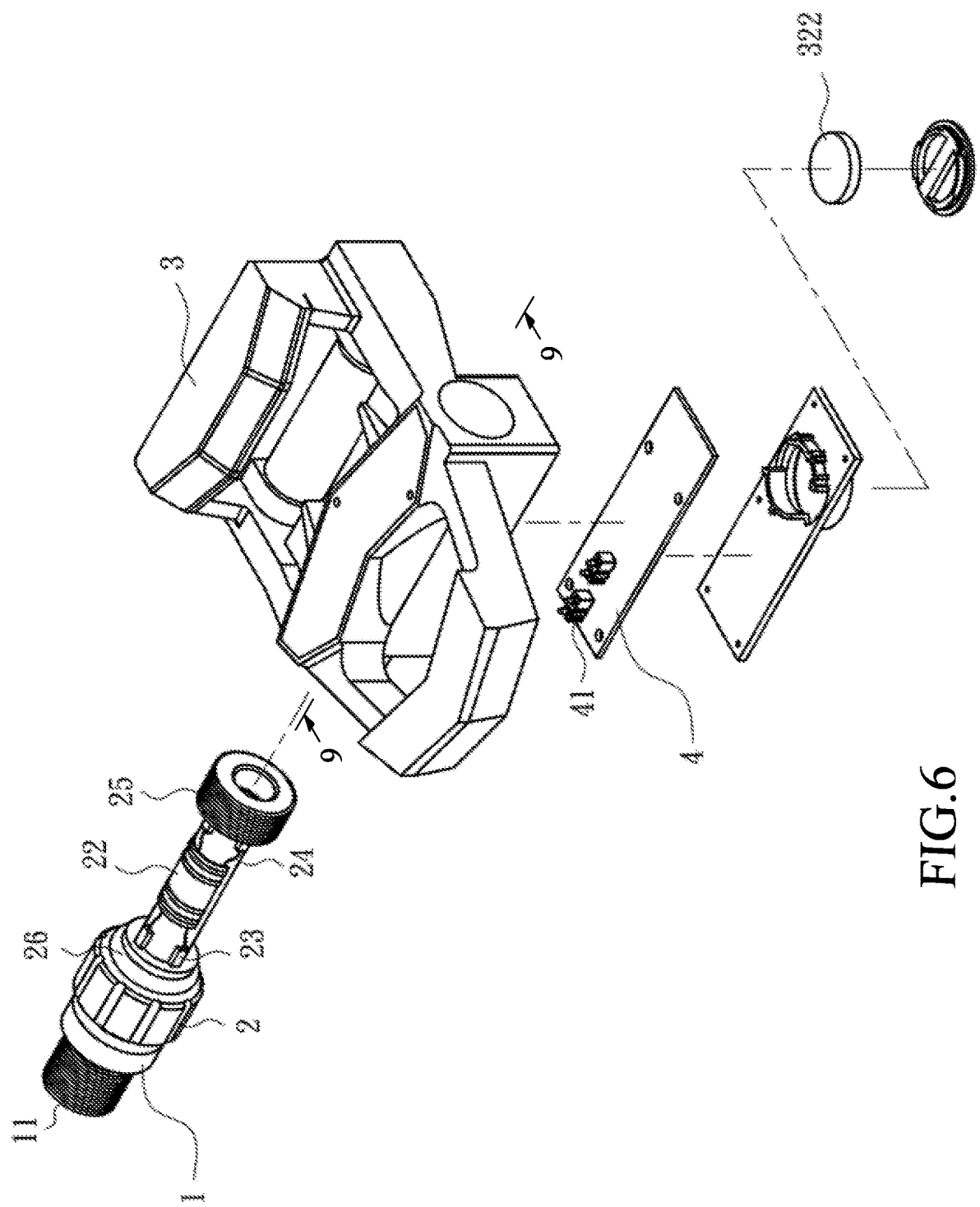
FIG. 6 is an exploded view of the pedal exercise signal detection device of the first embodiment of the present invention.
Figure 7:
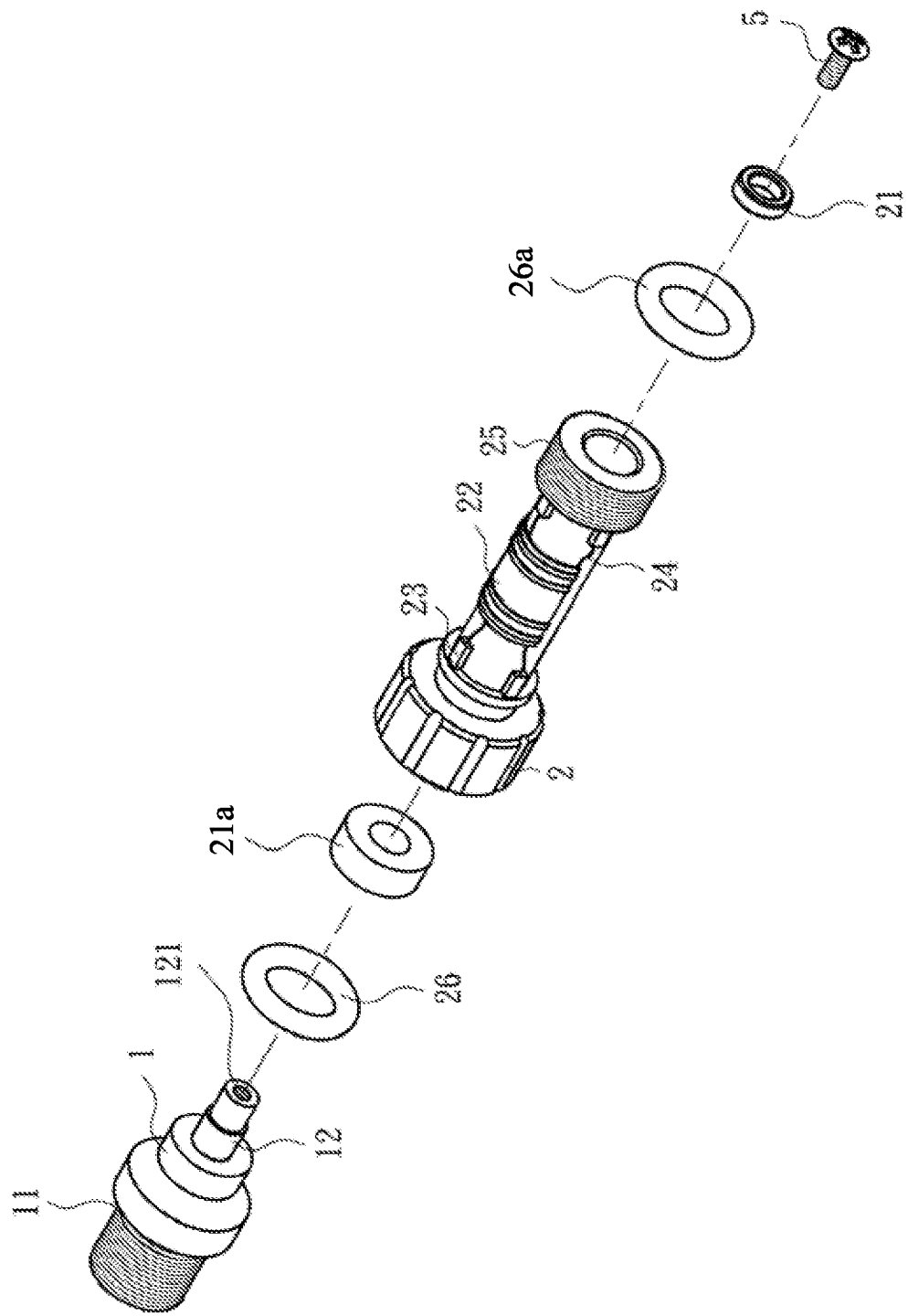
FIG. 7 is an exploded view showing a stator and a sleeve of the present invention.

Referring to FIGS. 5-7, the present invention provides a pedal exercise signal detection device according to a first embodiment of the present invention, which generally comprises a stator 1, a sleeve 2, a pedal 3, a control circuit board 4, and a fastener element 5. The stator 1 is coupled by the fastener element 5 to the sleeve 2. The stator 1 has an end provided with a thread 11 for coupling with a pedal crank (not shown) of a bicycle. The stator 1 has another end that is opposite to the thread 11 and is extended to form a positioning axle 12. The positioning axle 12 has a distal free end that is provided with an axially extending fastening hole 121 formed therein. An inner circumference of the fastening hole 121 and an outer circumference of the fastener unit 5 are provided with thread structures that correspond to and are engageable with each other.

Figure 8:
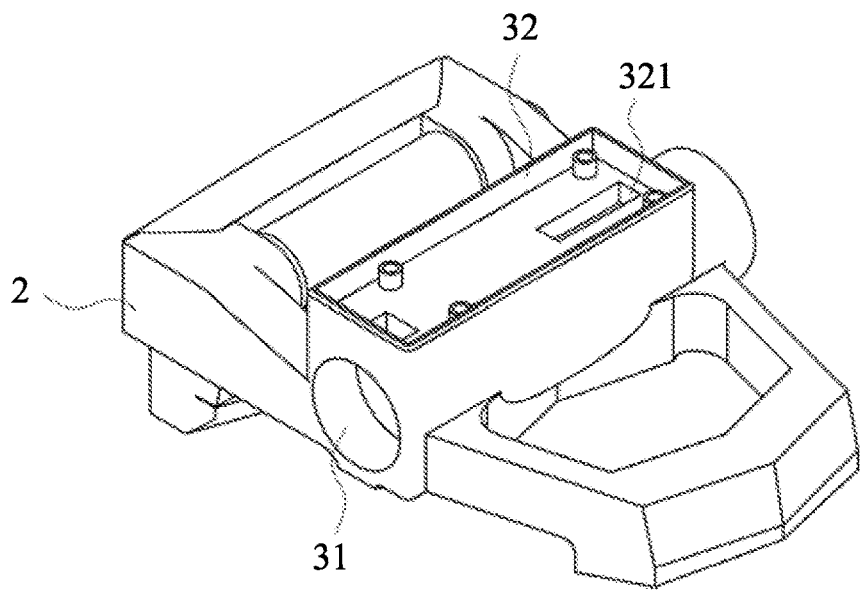
FIG. 8 is a perspective view of a pedal according to the present invention taken from a different angle.
Figure 9:
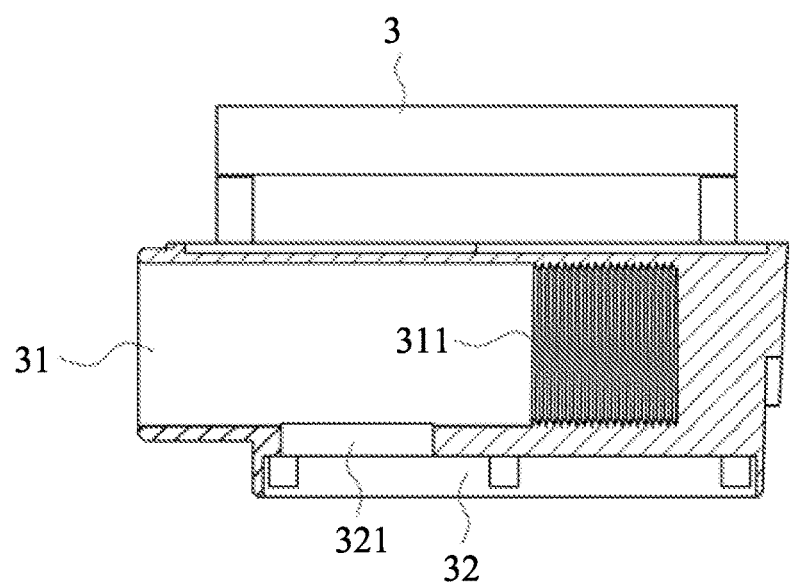
FIG. 9 is a cross-sectional view taken along line 9-9 of FIG. 6.

Referring collectively to FIGS. 8-9, the pedal 3 comprises an axle hole 31 and a receiving trough 32 formed therein. The axle hole 31 is provided, in an interior thereof, with an internal thread 311. When the sleeve 2 is inserted, with the end thereof that is provided with an external thread 25, into the axle hole 31, the external thread 25 of the sleeve 2 is screwed onto an internal thread 311 of the axle hole 31.

The receiving trough 32 is formed in a bottom of the pedal 3. The control circuit board 4 is received and fixed in the receiving trough 32. The receiving trough 32 is provide with and communicating with a through opening 321 formed in a location that corresponds to a pressure signal connection device 22.

Figure 10:
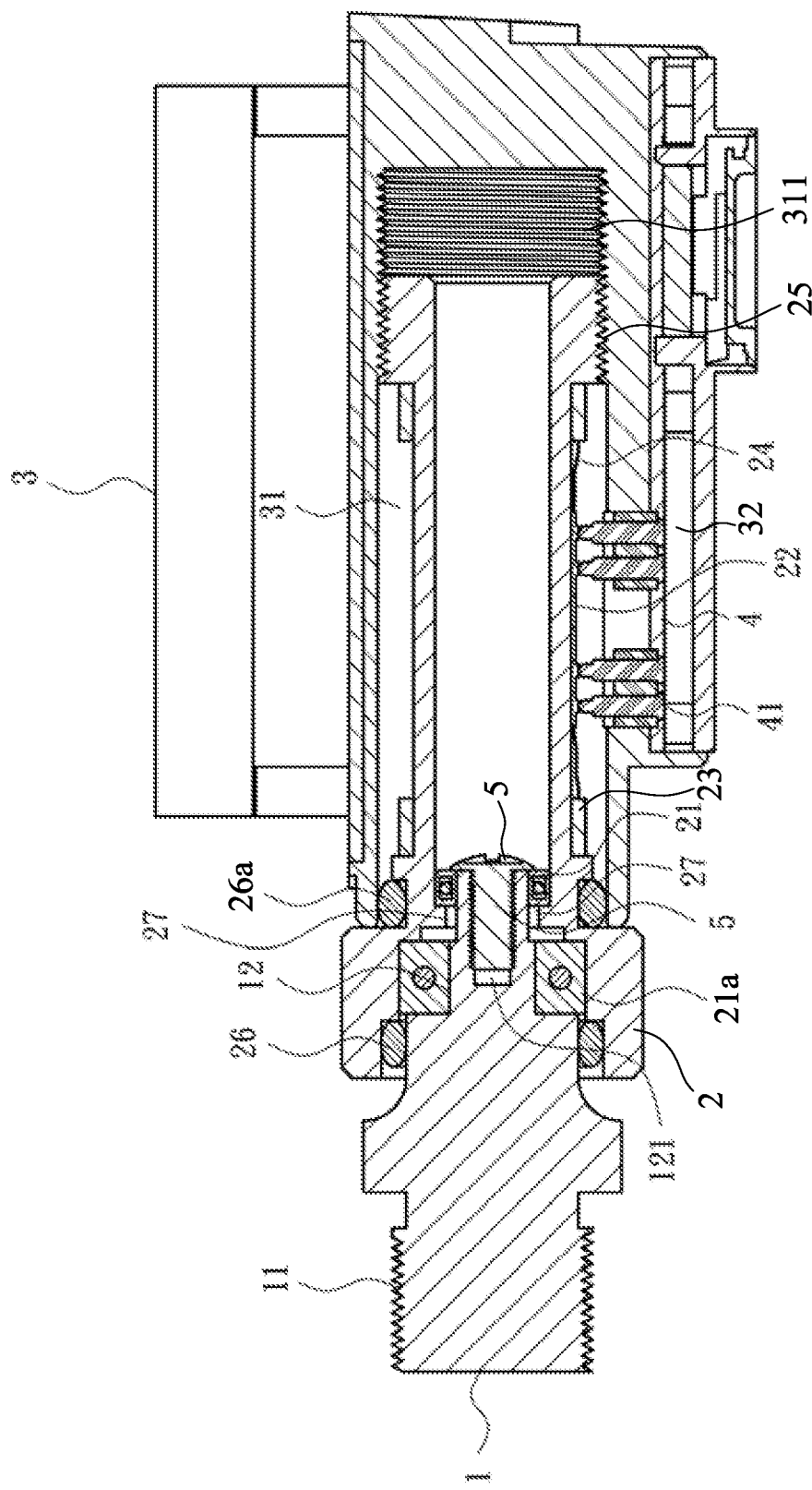
FIG. 10 is a cross-sectional view taken along line 10-10 of FIG. 5.

Referring also to FIG. 10, the sleeve 2 has an end that is formed with a positioning hole 27, and a first bearing 21 is arranged between the positioning hole 27 and the positioning axle 12 of the stator 1. The first bearing 21 is arranged coaxial with respect to the positioning hole 27 to receive the positioning axle 12 to extend therethrough. The fastener element 5 is receivable into the sleeve 2 and is screwed into and fixed to the fastening hole 121 of the positioning axle 12 extending through the first bearing 21 and the positioning hole 27 so as to couple the stator 1 and the sleeve 2 to each other. Further, the end of the sleeve 2 into which the stator 1 is inserted has an outer circumference that is provided with an external thread 25.

The open end of the sleeve 2 into which the stator 1 is inserted is provide with a second bearing 21a arranged therein, and a first water-resistant rubber ring 26 is arranged between the stator 1 and the sleeve 2. The sleeve 2 has a middle section having an outer circumferential surface on which at least one pressure signal connection device 22 is mounted and one or multiple pressure detection units 23 are provided on each of two opposite sides of the pressure signal connection device 22. Each of the pressure detection units 23 is operable to detect an exercise signal that is transmitted through a transmission line 24, a pressure signal connection device 22, and a signal reader unit 41 to a control circuit board 4.

Figure 11:
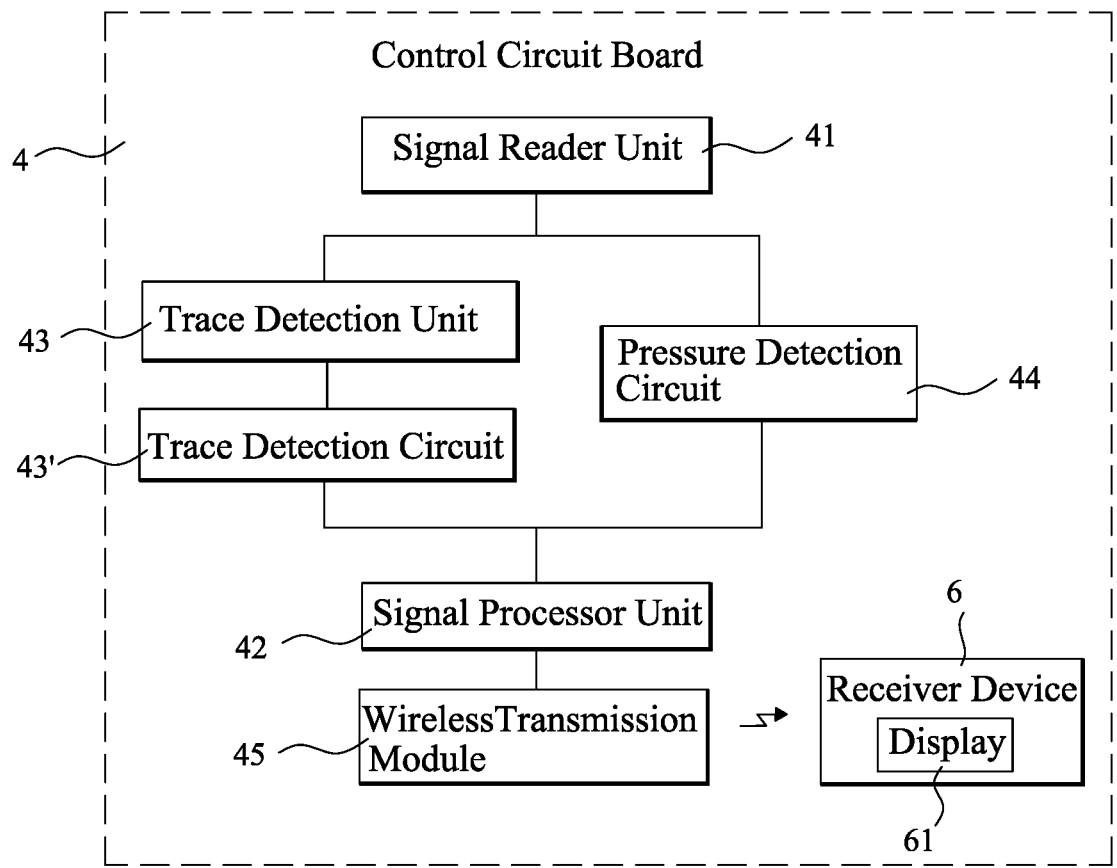
FIG. 11 is a functional block diagram of a control circuit board of the present invention.
Figure 12:
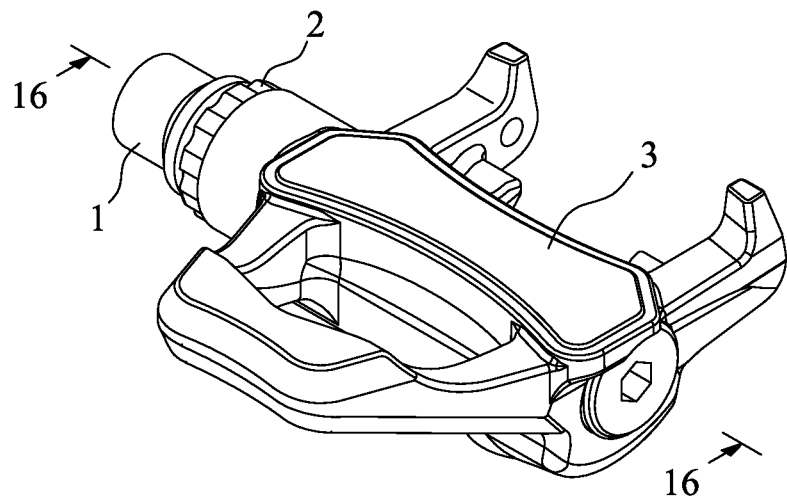
FIG. 12 is a perspective view of a pedal exercise signal detection device according to a second embodiment of the present invention.
Figure 13:
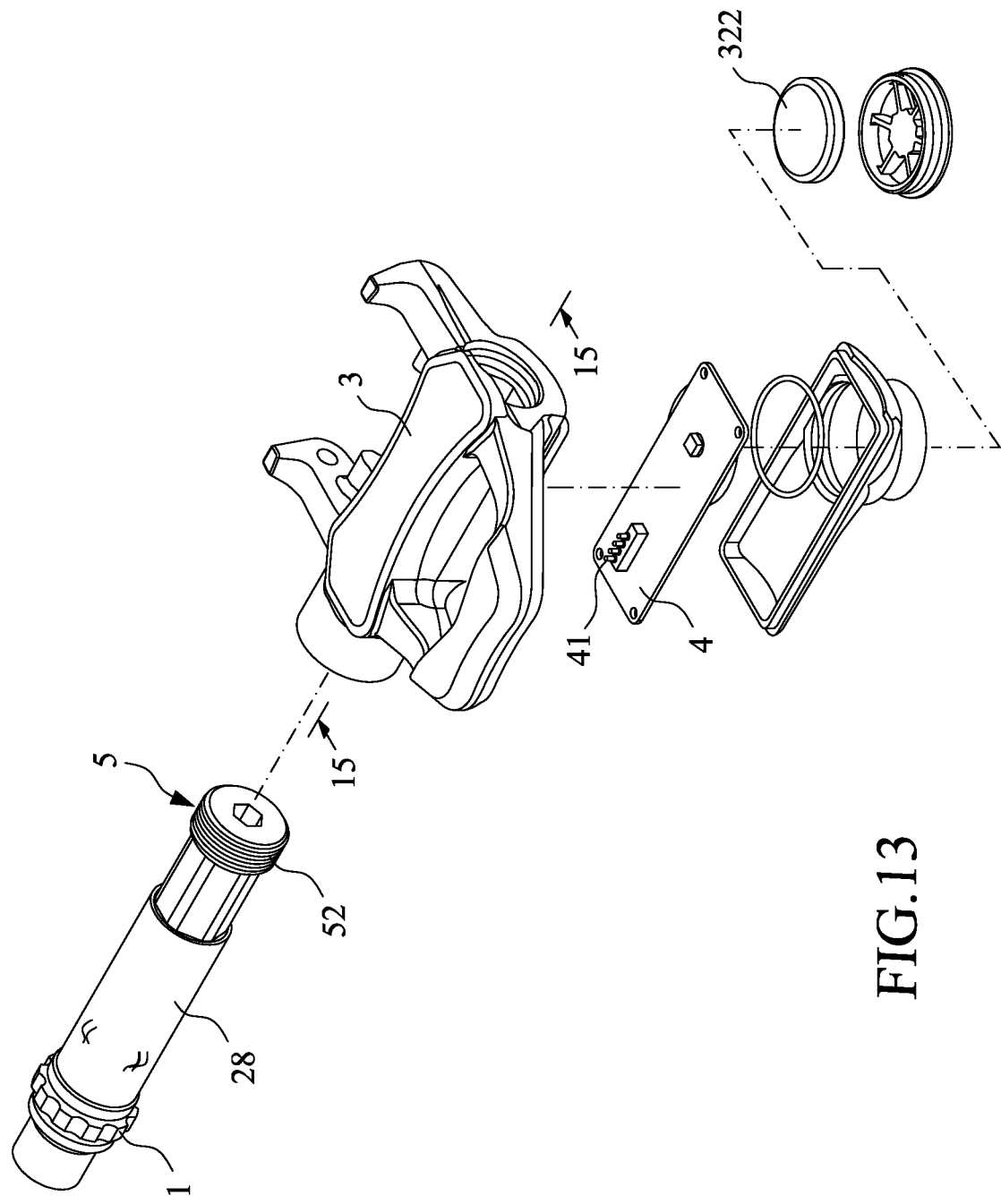
FIG. 13 is an exploded view of the pedal exercise signal detection device of the second embodiment of the present invention.
Figure 14:
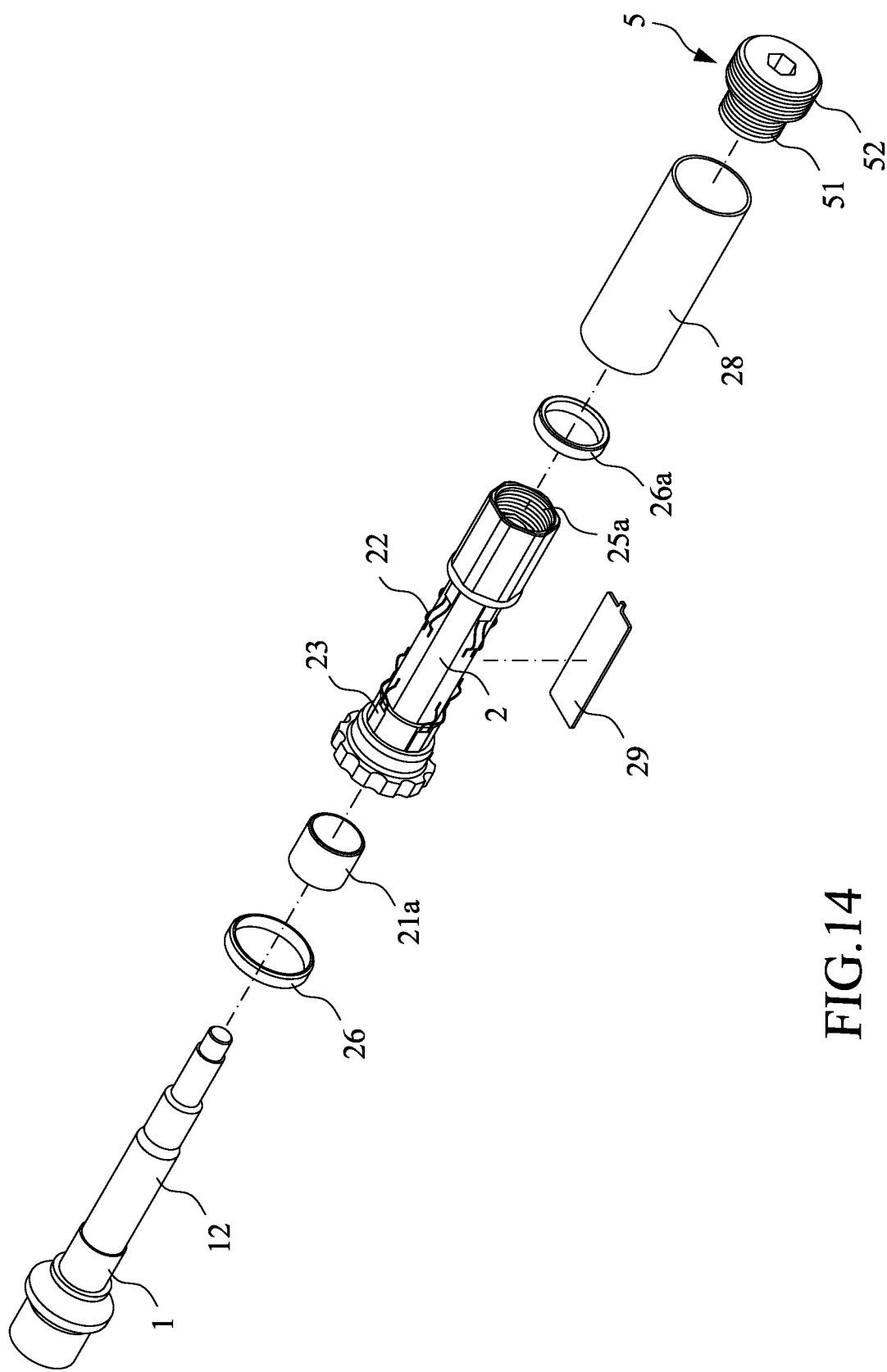
FIG. 14 is an exploded view showing a stator and a sleeve of the second embodiment of the present invention.
Figure 15:
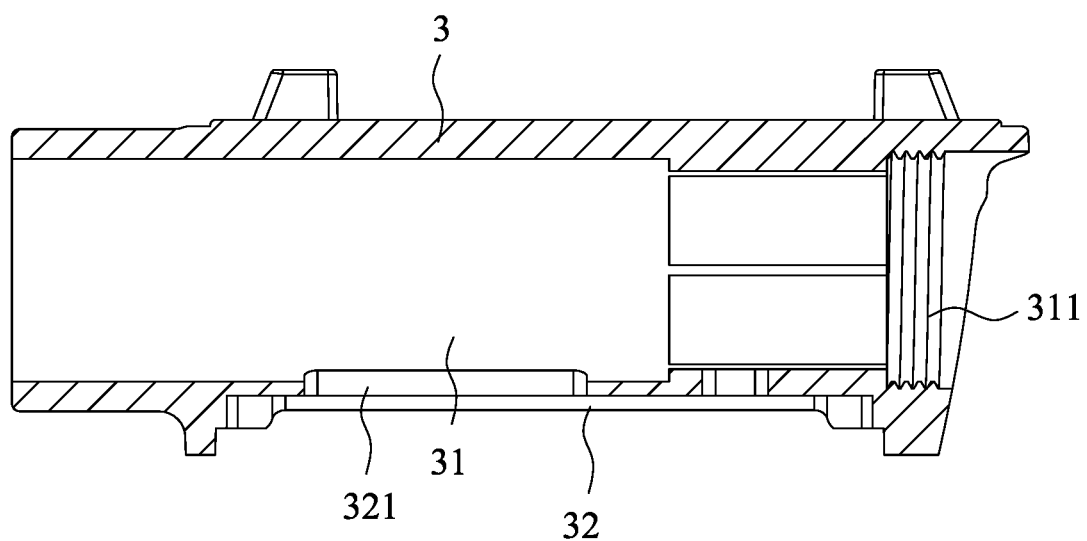
FIG. 15 is a cross-sectional view taken along line 15-15 of FIG. 13.
Figure 16:
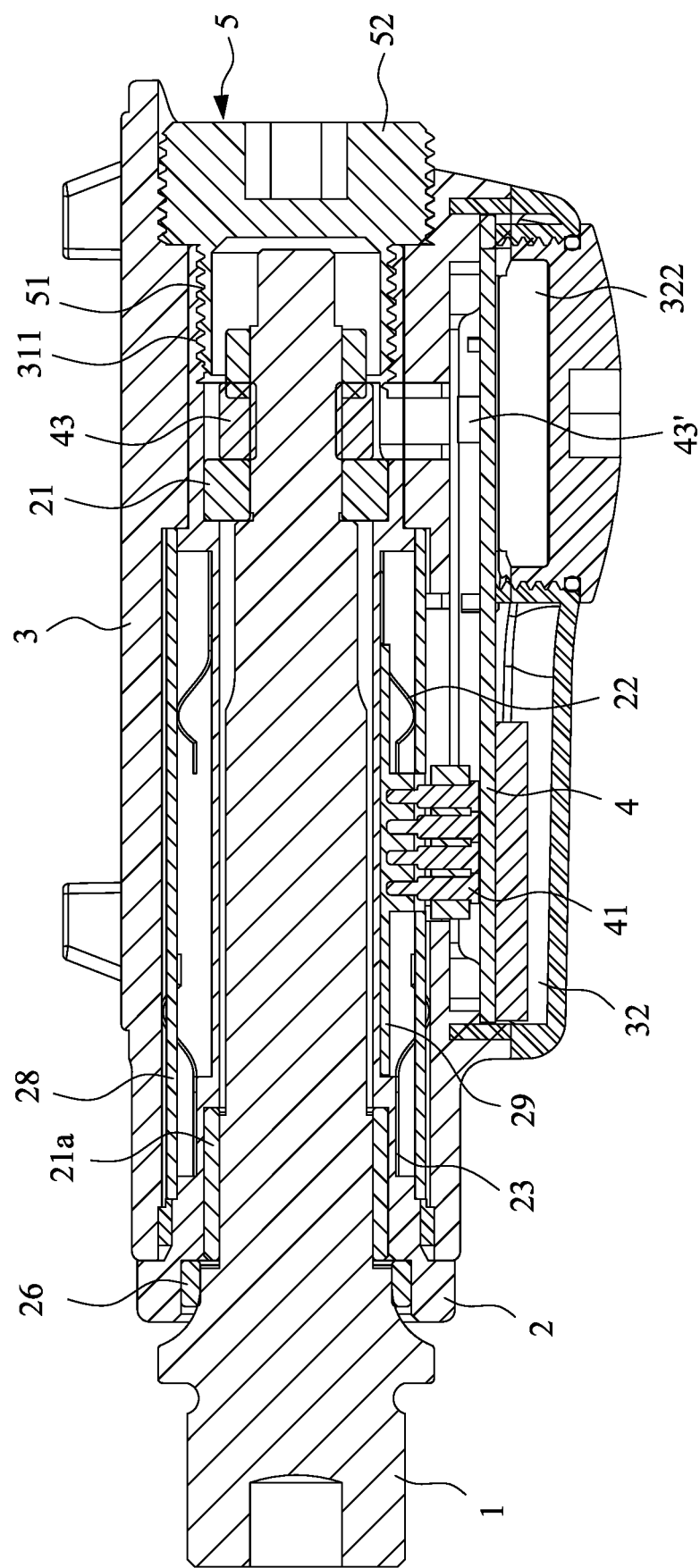
FIG. 16 is a cross-sectional view taken along line 16-16 of FIG. 12.

Referring to FIG. 11, the control circuit board 4 comprises a signal reader unit 41, a signal processor unit 42, a trace detection unit 43, a trace detection circuit 43', a pressure detection circuit 44, and a wireless transmission module 45. The signal reader unit 41 comprises a structure of a probe having a top end projecting through the through opening 321 of the receiving trough 32 so as to contact with the pressure signal connection device 22. The pressure detection circuit 44 reads, through the signal reader unit 41 and the pressure signal connection device 22, at least one exercise force application signal detected by the pressure detection units 23. The trace detection unit 43 and the trace detection circuit 43' are operable to detect at least one exercise trace signal of the pedal and transmit the exercise trace signal to the signal processor unit 42. The trace detection unit 43 can be directly mounted to or formed on the control circuit board 4 or can alternatively be separate from and independent of the control circuit board 4.

The receiving trough 32 receives and holds therein a power supply device 322, which supplies electrical power necessary for the operations of the control circuit board 4, the pressure signal connection device 22, and the pressure detection units 23. When the sleeve 2 is received in the axle hole 31, an opening between the sleeve 2 and the axle hole 31 is provided with and closed by a second water-resistant rubber ring 26a to protect the pressure signal connection device 22 and the pressure detection units 23 against malfunctioning caused by moisture.

When a rider rides the bicycle, the pedal exercise signal detection device of this invention is operable to detect variation of a position of the pedal 3 due to the rider treading the pedal 3 by means of the pressure signal connection device 22 so as to acquire a pedal angle signal concerning an angular position of the pedal 3 and is also operable to acquire an exercise force application signal concerning a force application condition of the rider treading the pedal 3 by means of detection carried out by the pressure detection units 23. The exercise force application signal concerning the force application condition of the rider treading the pedal 3 detected by the pressure detection units 23 is transmitted through the transmission line 24, the pressure signal connection device 22, the signal reader unit 41 to the pressure detection circuit 44, and then fed to the signal processor unit 42. The trace detection unit 43 and the trace detection circuit 43' are operable to acquire the exercise trace signal concerning angular position variation of the pedal 3 in space. The signal processor unit 42, after receiving the pedal angle signal, the exercise force application signal, and the exercise trace signal, may acquire a combined exercise signal, and transmits the exercise signal through the wireless transmission module 45 to a display 61 of a receiver device 6 to present as exercising reference information to the rider.

Referring to FIGS. 12-16, the present invention provides a pedal exercise signal detection device according to a second embodiment of the present invention. The components of the instant embodiment are equivalent to those of the first embodiment and equivalent components are designated with the same reference numerals for consistency.

In the second embodiment of the represent invention, the pedal exercise signal detection device comprises a stator 1, a sleeve 2, a pedal 3, a control circuit board 4, and a fastener element 5. The stator 1 is coupled by the fastener element 5 to the sleeve 2. An outer circumference of the fastener unit 5 is provided with a sleeve-side external thread 51 that corresponds to and is engageable with an internal thread 25a formed on a free end of the sleeve 2 that is opposite to the positioning hole 31 of the sleeve 2. Further, the fastener element 5 is further provided with an end section external thread 52 that corresponds to and is engageable with an internal thread formed on the axle hole 31 of the pedal 3. So, the sleeve 2 may be stably engaged with the stator 1, preventing the pressure detection units 23 from unexpected deformation caused by assembled differences of the sleeve 2.

A sleeve-side circuit board 29 is mounted on the sleeve 2, arranged on a position corresponding to the signal reader unit 41 of the control circuit board 4. A sleeve protection tube 28 is associated with the sleeve 2 to protect the pressure signal connection device 22, the pressure detection units 23 and the sleeve-side circuit board 29.

At least one trace detection unit 43 such as a magnetic element is positioned on an outer circumference near to the free end of the sleeve 2. At least one trace detection circuit 43' such as a reed switch is arranged on the control circuit board 4 and corresponds to the trace detection unit 43. The trace detection unit 43 and the trace detection circuit 43' are operable to detect at least one exercise trace signal of the pedal 3 and transmit the exercise trace signal to the control circuit board 4.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A pedal exercise signal detection device for detecting an exercise signal generated by a rider treading a pedal of a bicycle and transmitting the exercise signal to a display to present exercising reference information to the rider, comprising:

a sleeve having an external circumference that is provided with at least one pressure signal connection device and at least one pressure detection unit, an end of the sleeve being formed with a positioning hole;

a first bearing disposed in the sleeve and set against a circumferential surface of the sleeve at the end in which the positioning hole is formed, the first bearing being coaxial with respect to the positioning hole;

a stator having a positioning axle extending through the positioning hole of the sleeve and the first bearing;

a fastener element for coupling the sleeve to the stator;

the pedal formed with an axle hole and a receiving trough, the axle hole receiving the sleeve to insert therein so as to position the sleeve in the axle hole, the receiving trough being formed in a bottom of the pedal, the receiving trough comprising a through opening receiving the pressure signal connection device of the sleeve; and a control circuit board, which is disposed in the receiving trough of the pedal, the control circuit board comprising a plurality of signal reader units that extend through the through opening of the receiving trough to contact the pressure signal connection device.

2. The pedal exercise signal detection device as claimed in claim 1, wherein the control circuit board is fixed in the receiving trough of the pedal.

3. The pedal exercise signal detection device as claimed in claim 1, wherein the sleeve comprises a second bearing arranged in the positioning hole to receive the positioning axle to extend therethrough for supporting rotation of the sleeve about a center defined by the stator.

4. The pedal exercise signal detection device as claimed claim 1, wherein an inner circumference of the axle hole of the pedal and an outer circumference of the end of the sleeve that is opposite to an end of the stator into which the stator extends are provided with thread structures that correspond to and are engageable with each other.

5. The pedal exercise signal detection device as claimed claim 1, wherein an inner circumference of a fastening hole of the positioning axle and an outer circumference of the fastener element are provided with thread structures that correspond to and are engageable with each other.

6. The pedal exercise signal detection device as claimed claim 1, wherein the stator has an end that is opposite to the positioning axle is provided with a thread engageable with the bicycle.

7. The pedal exercise signal detection device as claimed claim 1, wherein the receiving trough of the pedal receives and holds a power supply device therein such that the power supply device supplies electrical power to the control circuit board, the pressure signal connection device, and the at least one pressure detection unit.

8. The pedal exercise signal detection device as claimed claim 1, wherein the control circuit board comprises a signal processor unit, a trace detection unit, a trace detection circuit, a pressure detection circuit, and a wireless transmission module, the pressure detection circuit being operable to read, through a signal reader unit and the pressure signal connection device, at least one exercise force application signal of a rider treading the pedal detected by the at least one pressure detection unit and being also operable to detect at least one exercise trace signal of the pedal by means of the trace detection unit and the trace detection circuit, the exercise force application signal and the exercise trace signal being supplied to the signal processor unit, so that the signal processor unit carries out computation to obtain a combined exercise signal of the rider and transmits the exercise signal through the wireless transmission module to the display to present the exercising reference information to the rider.

9. The pedal exercise signal detection device as claimed in claim 1, wherein the pressure signal connection device is arranged on an outer circumference of the sleeve at approximately a middle thereof and the at least one pressure detection unit is mounted on a surface of the outer circumference of the sleeve and adjacent to one side of the pressure signal connection device.

10. The pedal exercise signal detection device as claimed in claim 1, wherein the positioning axle of the stator is provided with a fastening hole formed on a free end of the stator, and the fastener element is received into the sleeve and extends through the first bearing and the positioning hole to fasten to the fastening hole of the stator.

11. The pedal exercise signal detection device as claimed claim 1, wherein the fastener element is provided with a sleeve-side external thread that is engageable with an internal thread formed on a free end that is opposite to the positioning hole of the sleeve, and the fastener element is further provided with an end section external thread that is engageable with an internal thread formed on the axle hole of the pedal.

12. The pedal exercise signal detection device as claimed claim 1, further comprises a sleeve protection tube which is engaged with the sleeve.

* * * * *